United States Patent [19]

Drdlik

[11] 4,363,183
[45] Dec. 14, 1982

[54] ANIMAL TRAP

[76] Inventor: Frank J. Drdlik, 3634 San Jose La., Santa Barbara, Calif. 93105

[21] Appl. No.: 201,132

[22] Filed: Oct. 27, 1980

[51] Int. Cl.³ ............................................. A01M 23/30
[52] U.S. Cl. ......................................... 43/81.5; 43/81
[58] Field of Search ............................. 43/81, 81.5, 82

[56] References Cited

U.S. PATENT DOCUMENTS

| 891,880 | 6/1908 | Timby | 43/82 |
|---|---|---|---|
| 1,477,446 | 12/1923 | Reisiger | 43/81.5 |
| 2,543,466 | 2/1951 | Petersen | 43/81 |
| 2,616,211 | 11/1952 | Johnson | 43/81 |
| 3,394,488 | 7/1968 | Kruger | 43/81 |
| 4,161,080 | 7/1979 | Gabry | 43/82 |

Primary Examiner—Nicholas P. Godici
Assistant Examiner—M. Jordan
Attorney, Agent, or Firm—Roger A. Marrs

[57] ABSTRACT

An animal trap is disclosed herein which includes a base movably supporting a spring loaded U-shaped jaw that is releasably held to the base by a safety latch mechanism. A bait treadle is movably carried on the base in cooperating relationship with the jaw via a trigger mechanism so that the jaw is actuated upon disturbance of the bait treadle. A cage-like structure is carried on the base and partially encloses the bait treadle so that the animal is guided into a predetermined orientation or position whereby the actuated jaw will strike a vital area of the animal.

5 Claims, 6 Drawing Figures

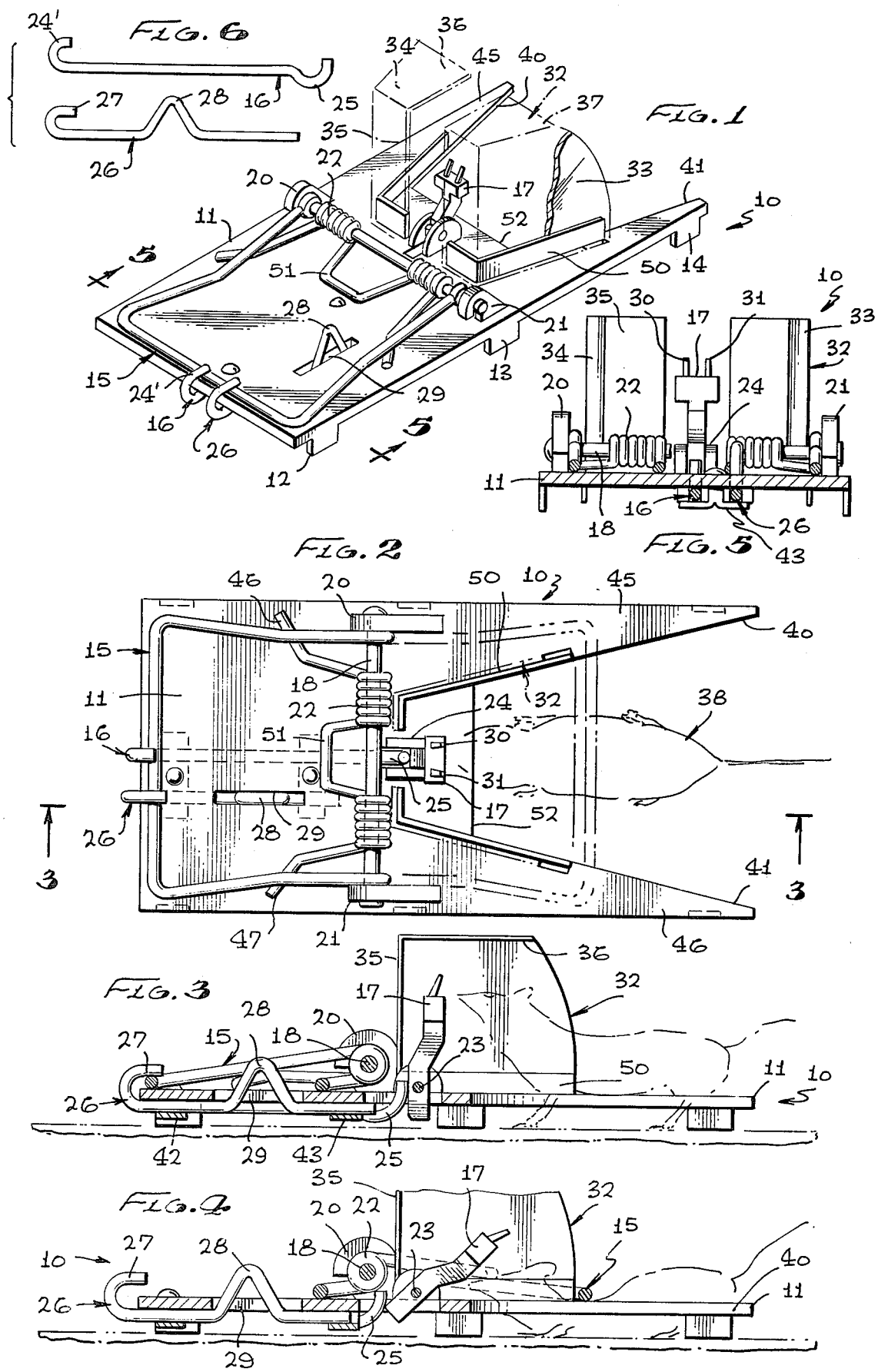

ANIMAL TRAP

BACKGROUND OF THE INVENTION

1. Field of the Invention

The present invention relates to the field of animal traps and more particularly to a novel animal trap employed in the elimination of mice, rats and other rodents which incorporates improved release latch mechanism, guided approach to the bait and other construction details useful in mass production of the trap.

2. Brief Description of the Prior Art

In the past, traps of the present type have been known for many years and have been improved from time to time. The most recent improvements on traps of this type are described in U.S. Pat. Nos. 1,530,918 and 2,103,877. In both of these prior patents, the improvements dealt with the release mechanism of the trap so as to effect greater sensitivity to touch for release. These patents stress that in the course of manufacture of the latest improvement, accuracy and exactness need not be indulged and that the very looseness of the mechanism, in great measure, added to its sensitivity. Although the prior devices have proved successful in this regard, the prior devices often make it difficult to achieve safe and positive setting of the trap due to the unpredictable hypersensitivity since the trigger or latch comes under immediate attention and too readily effects release of the jaw before the adjusting human hand is withdrawn. Even after the trigger or latch is set, the trap jaw snaps shut at the moment of contact with the floor or ground.

Another problem exists with existing traps of this type which stems largely from the fact that the approach of the rodent to the bait is uncontrolled and upon actuation, the jaw may strike the animal in a variety of locations which may not be fatal to the animal. For example, the jaw may strike a leg, tail or other areas which only injure the animal and does not cause its death. In numerous instances, the jaw strikes with such force that portions of the animal are exposed which is unsightly and renders collection or gathering extremely distasteful.

Still further problems and difficulties have been encountered which stem largely from the fact that existing traps lack safety during the adjustment of the latch-bend into the bait treadle slot so that the jaw actuates and the hand or fingers of the user are injured. Also, children whose curiosity is aroused could well bring a measure of injury to their fingers by the lack of safety mechanisms on prior art traps.

Therefore, a long standing need has existed to provide an improved animal trap which not only includes a variety of safety to the fingers of the user but which will guide or promote the location of the animal into a position so that it will be fatal upon contact by the actuated jaw.

SUMMARY OF THE INVENTION

Accordingly, the above problems and difficulties are obviated by the present invention, which provides a novel animal trap having a base for movably supporting a spring loaded jaw that is releasably held to the base by a safety latch mechanism. A bait treadle is movably carried on the base and is in actuating contact with a trigger mechanism so that the jaw is actuated upon disturbance of the bait treadle. Means are carried on the base for partially enclosing the bait treadle whereby the animal is conducted in a guided relationship into a predetermined location adjacent the bait treadle whereby the actuated jaw will strike a vital area of the animal.

Among the primary objects of the present invention is the object to make available to the public at a competitive cost, an animal trap which embodies a safety device for effectively holding, under tension, the cocked jaw in place until the trigger or latch mechanism is slipped into retaining position and all pertinent adjustments are completed, at which point the safety device is manually released and the set trap will not spring shut until the animal activates the bait treadle or lever.

Another object of the present invention is to provide an animal trap so that when the latch or trigger is slipped to hold the jaw, this action automatically forces the bait treadle or lever into an upright position to render it sensitive to the least pull at the bait by the involved animal.

Still a further object of the present invention is to provide a novel animal trap which provides a spiked bait lever or treadle to facilitate easy placement of the bait thereon so that the person's fingers will not be inadvertently caught beneath the jaw.

Still another object of the present invention is to provide a novel animal trap having a safety means for holding the spring loaded jaw out of actuation during the baiting of the bait treadle.

Yet another object of the present invention is to provide a novel animal trap having means for directing the travel of an involved animal directly into the trap and to the bait so that the animal is in a preferred location to be struck by the actuated jaw of the trap.

Still a further object of the present invention is to provide a novel animal trap which is dependable and which is not so hypersensitive that actuation of the jaw occurs during abusive handling by the user.

A further object of the present invention is to provide a novel animal trap which may be readily assembled and manufactured at a reasonable cost and which may be suitable for mass production.

BRIEF DESCRIPTION OF THE DRAWINGS

Other objects and features of the invention and various advantages and characteristics of the present invention will be apparent from a consideration of the following detailed description when taken in connection with the accompanying drawings in which like numbers of reference denote corresponding parts throughout the several views, in which:

FIG. 1 is a front perspective view of the novel animal trap incorporating the present invention;

FIG. 2 is a top plan view of the animal trap shown in FIG. 1 with the jaw thereof illustrated in its actuated position in broken lines;

FIG. 3 is a longitudinal cross-sectional view of the animal trap shown in FIG. 2 as taken in the direction of arrows 3—3 thereof;

FIG. 4 is a view similar to the view of FIG. 3 illustrating the bait treadle and jaw in their actuated positions;

FIG. 5 is a transverse cross-sectional view of the animal trap as taken in the direction of arrows 5—5 in FIG. 1; and FIG. 6 is a side-elevational view of the safety latch and the trigger respectively as employed in the animal trap shown in FIG. 1.

DESCRIPTION OF PREFERRED EMBODIMENT

Referring to FIG. 1, the novel animal trap of the present invention is illustrated in the general direction of arrow 10 which includes a base or platform 11 which is supported on a surface by means of downwardly depending legs indicated by numerals 12, 13 and 14 respectively. It is to be understood that identical legs are provided on the opposite side of the platform or base 11. A jaw 15 of substantially U-shaped configuration which is released by a trigger or latch 16 in cooperation with a bait treadle 17 pivots about a spindle or axle 18 which is secured in place by a pair of hook-shaped protrusions 20 and 21 carried on opposite sides of the base or platform 11. A spring 22 urges the jaw from the set position shown in FIG. 1 toward the released position shown in dotted lines in FIG. 2. The bait treadle 17 is also pivotally mounted on the platform by means of a pin 23 carried in a yoke 24. The trigger or latch 16 is preferably a piece of stiff wire having a hook 24' formed at one end and a foot 25 carried at its opposite end in abutting contact with one end of the treadle 17. The trigger or latch 16 is more clearly illustrated in FIG. 6.

The animal trap 10 further includes a safety latch which takes the form of a stiff wire 26, also shown in FIG. 6, which includes a hooked end 27 for selectively engaging with the jaw 15 and a bent or knob portion 28 which projects through an opening 29 in the base 11. The knob 28 is moved by the thumb of the user forwardly and rearwardly within the slot 29 to advance and retract the hook end 27 so that it will engage or disengage with the jaw respectively.

The bait treadle 17 further includes a pair of spikes or pin-like prongs 30 and 31 which are intended to receive and mount a quantity of animal bait. Preferably, the bait should be composed of a material or matter which is appealing to the particular animal intended to be trapped so that the animal will be drawn directly to the bait and hence, the trigger mechanism. A featur of the present invention involves the provision for a cage-like device or unit indicated in general by numeral 32 which semi-encloses the bait and the bait treadle 17 so that the animal will have access thereto in only one direction or manner. By guiding the animal into the cage-like unit, the animal will be in a preferred position to receive the jaw 15 when it is released and urged toward the animal by the force of spring 22.

Therefore, the animal will be in a preferred position to receive the lethal blow of the jaw substantially in the neck area. The cage-like unit 32 includes opposite sidewalls 33 and 34 as well as a divided front plate 35. The front plate 35 extends rearwardly to provide top portions 36 and 37 respectively. The length of the cage-like unit 32 is arranged so that the jaw 15 will clear the top portions 36 and 37 when urged by spring 22 to provide the lethal blow.

As shown more clearly in FIG. 2, an animal represented by numeral 38 is drawn into the trap by the smell of the bait on the bait hooks 30 and 31. The base 11 is provided with a cut-out converging toward the bait treadle 17 as indicated by edges 40 and 41 respectively. By virtue of the cage-like unit 32, the animal can approach the bait only through the cut-out in the base 11 and is somewhat confined by the enclosure of the unit 32 so that the animal is in a preferred position to be struck the lethal blow.

FIG. 2 also shows that by actuating the knob or portion 28 of the safety latch 26, the hook 27 may be placed in a position to capture the jaw 15 and to restrain the jaw from actuation by the urging of spring 22. However, when the latch is moved in the position shown in broken lines, the hook 27 will release the jaw so that the hook 24 associated with the trigger mechanism will control release.

Referring now to FIG. 3, it can be seen that both the trigger or latch 16 and the safety latch 26 are slideably mounted beneath the base 11 and are slideably supported in mounts 42 and 43 attached to the base by staples or rivets. Also, it can be seen that the foot 25 of the trigger or latch 16 abuts against a portion of the treadle 17 so that as the treadle 17 pivots in the direction of the animal, the lever 17 will push against the latch 16 causing the hook 24 to release the jaw 15. This action is more clearly shown in FIG. 4 wherein the bait treadle 16 is pulled by the animal so as to pivot and push the trigger 16 forwardly, releasing the jaw. Additionally, when the trap is reset, it should be noted that the pushing in of the retention hook 24 and the trigger 16 automatically effects the raising of the bait lever 17 since the foot 25 bears against the lever 17 and causes it to pivot upwardly.

Referring now in detail to FIG. 5, it can be seen that the latches 16 and 26 respectively are slideably supported by mounts 42 and 43 on the underside of the base 11. Provision of the feet 12–14 inclusive on opposite sides of the base 11 provide a clearance area immediately beneath the base 11 for mounting of the lever 16 and 26 as well as the mount 42 and 43 respectively.

In actual practice, the animal trap 10 consists of a single, light-weight plastic casting or base 11 with two extended legs 44 and 45 at each side toward the rear of the base. A pair of integrally cast, hook-shaped protrusions are carried on the top of the base 11 to effect anchoring of the jaw 15 by sliding the axle of the spring 22 into position between the pair of protrusions. This procedure simplifies the task of assembly. The constant upper pressure supplied by the rectangular spring-heel, indicated by numerals 46 and 47, maintains the spring axle secured within the crook of the holding hooks of the protrusions. A sizeable area is defined by the cut-out between the edges 40 and 41 which define a converging entrance or approach to the bait at ground level. This end approach area is of a stunted wedge shape beginning at the rear corners and narrowing in width inwardly to a junction with a transverse segment 52 of the base top. Beginning approximately at the mid-point of the tapered or flared side edges 40 and 41 of the wedge shape and continuing forward on top of the face of the base to a point of juncture with a like segment at an obtuse angle, a low, thin plastic wall is provided as indicated by numeral 50, which acts as a support and guide for the positioning of the cage device unit 32. A rectangular slot or perforation of sufficient width and length is provided through the base immediately ahead of the cut-out to permit the vertical stem or foot 25 at the inner end of the trigger or latch 16 to slide back and forth. The yoke comprising extensions 23 and 24 receive and hold in position, the narrow stubbed axles or pins provided at each side of the bait lever 17 so that pivoting of the bait lever is achieved.

Still another slot or perforation is provided through the base top for slideably receiving the insertion of the upright manual setting and release knob or stem 28 of the safety catch. The bottom face of the base 11 is provided with two rectangular mounts 42 and 43 which are cast directly along the center line of the base. Both of these mounts are of sufficient width to accommodate a rivet hole. Each of the mounts includes a guide trough to freely accommodate the sliding trigger and safety latches 16 and 26 respectively.

The spring 22 and jaw 15 consists of rust-resistant wires and axle. The jaw 15 is a wire of a gauge and temper to retain its shape during its prolonged and repetitious use. The spring axle has a broad head at one end and extends at both ends beyond the jaw loops located along the outer faces of the plastic hooks or protrusions to allow a crimp at the free end for permanent positioning. The spindle or axle 18 is of a diameter to provide freedom of tension for the enveloping spring 22. The spring 22 consists of a single wire formed to provide a rectangular tension heel 51 at its center, from which it winds in opposite directions around the axle, to create equal spring halves of sufficient reaction force to effect the immediate demise or death of the involved animal. At the outer ends of the spring, the wire flares outwardly at a mild angle for a brief distance, ending at both ends with shallow up-pointed hooks 46 and 47, which engage, at mid-point, the side-arms of the jaw. In manufacture, this unit is completely pre-assembled for its installation between the provided plastic protrusion hooks carried on the base 11.

In further description of an actual embodiment, the trigger device including the trigger or latch 16 consists of a single wire similar to that of the jaw 15 and is formed to provide a short hook 24 at its outer end, of sufficient spread to overlap the thickness of the base 11 and the thickness or diameter of the jaw 15 at its mid-point. Nearing the inner end of the trigger latch 16, a shallow crook, pointing downward is provided at numeral 51 to hold the vertical end segment 25 in the outer end hook 24 in an upright position. In the course of pushing the hook inward to effect its retention of the jaw 15, the inner end or foot 25 of the latch 16, automatically, forces the bait lever 17 into a vertical position as shown in FIG. 3.

The sliding safety device consists of a latch wire 26 similar to the one employed for the trigger latch 16 and is formed to provide, at its outer end, a longer hook 27 than the hook 24' with sufficient spread to overlap the thickness or diameter of the jaw 15 in its cocked position and the thickness of the base 11. A short distance inwardly from the hooked end, the wre shaft is bent to form an acutely angled crook serving as a knob 28 which slips through the provided slot in the base. By projecting above the base top surface, a positive finger contact is assured for manual manipulation. From the inner base of this crook 28, the wire shaft continues inwardly within the guide walls of the mount to a distance assuring its retention in position in like manner as the trigger shaft is retained by crimping of the split-rivet ends.

The bait lever 17 consists of a square shaft, which is angled at its mid-point to make the bait slightly more available to the animal. The shaft is widened at the top to provide a greater spread of two pin-like prongs 30 and 31 cast atop this widened portion. At both sides of the shaft, a short distance up from the bottom end, a narrow stubbed axle is provided which is inserted into holding slots in the yoke 24 and under downward pressure snap locks into position so as to pivot thereon. The lower end of the treadle 17 is slightly grooved and rounded at the corner as shown more clearly in FIGS. 3 and 4 which contacts and actuates the upright end segment or foot 25 of the trigger latch 16. The bottom of the lever passes through a mating slot or perforation in the base 11 to a distance which, when the stubbed axles are in place, supplies an extreme and favorable leverage ratio to effect backward movement of the trigger latch for full release of the retention hook 16 from its holding engagement with the jaw 15.

The cage-like device or unit 32 consists of two halves or parts indicated by numerals 36 and 37 which form the sides and front face of the cage. These parts are separated solely for their collapsability stacking within the wedge-shaped ground area. Thus, enabling the final packing of the complete trap into a flat, clear plastic, envelope for display in shipping. The structurally angled, semi-rigid sides and decking serve to confine the animal and to deny the animal access to the bait, except through the open end of the cage guided by the wedge-shaped cut-out between edges 40 and 41 respectively. Generally, the one-directional approach and the location of the bait, cause the animal to be positioned to receive the lethal blow of the jaw 15 in the animal's neck area. This obviates the gruesome site of swollen bellies, bulging eyes, and otherwise distorted features. Also, due to the omitted base top area, the struck animal invariably drops to ground level free of the trap, for simpler collection and cleaner disposal. Each half of the cage has two protruding extensions along the side wall bottom, which fit into the perforated slits provided for their anchoring and stability. Positioning of the cage halves into the slits is readily accomplished with the assistance of the adjoining low wall atop the base identified by numeral 50.

While particular embodiments of the present invention have been shown and described, it will be obvious to those skilled in the art that changes and modifications may be made without departure from this invention in its broader aspects, and therefore, the aim in the appended claims is to cover all such changes and modifications as fall within the true spirit and scope of this invention.

What is claimed is:

1. An animal trap comprising:
   a base having a sizable V-shaped cut-out portion defined by opposing base edges converging from a rear edge to terminate at a mid-section area between opposite ends of said base;
   a jaw pivotally carried on said base adapted to pivot about said mid-section;
   resilient means operably coupling said jaw to said base wherein said jaw is normally biased to pivot across said V-shaped cut-out;
   a bait actuator means movably carried on said base at its mid-section immediately adjacent to the termination of said converging opposing base edges and being operably coupled to said jaw to yieldably restrain said jaw from pivoting;
   a safety latch movably carried on said jaw to hold said jaw against the bias of said resilient means independent of and in addition to said bait actuator means;
   said bait actuator means includes a bait treadle pivotably carried on said base mid-section and having a bait carrying end and an actuator slidably carried on said base between said jaw and said bait treadle being engagable with said jaw and adapted to release said jaw in response to pivoting of said bait treadle;
   a cage-like structure fixedly carried on said base partially enclosing said bait treadle in spaced apart relationship and serving as a guide along with said opposing base edges to direct an approaching animal into a predetermined orientation occupying said V-shaped cut-out portion whereby said jaw when released will strike a vital area of the animal.

2. The invention as defined in claim 1 wherein:
said actuator slides in one direction to release said jaw in response to said bait treadle and slides in an opposite direction to reset said bait treadle preparatory to restraint of said jaw.

3. The invention as defined in claim 2 wherein:
said safety latch is slidably carried on said base in parallel to said actuator and having a hook at one end adapted to engage with said jaw and having a finger setting member at its opposite end.

4. The invention as defined in claim 3 including:
a yoke carried on said base mid-section area and pivot means mounting said bait treadle thereon so that its opposite ends carry bait and engage with said actuator respectively.

5. The invention as defined in claim 4 wherein:
said base includes a plurality of feet or stand-offs spaced apart on its underside so as to raise said base above a support surface upon which the animal travels.

* * * * *